United States Patent
Hsu (10) Patent No.: US 9,832,359 B2
(45) Date of Patent: Nov. 28, 2017

(54) FOCUSING METHOD (71) Applicant: NOVATEK Microelectronics Corp., Hsin-Chu (TW)

(72) Inventor: Wei Hsu, Taoyuan County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 111 days.

(21) Appl. No.: 14/149,840

(22) Filed: Jan. 8, 2014

(65) Prior Publication Data
US 2015/0103231 A1   Apr. 16, 2015

(30) Foreign Application Priority Data
Oct. 16, 2013   (TW) .............................. 102137391 A (51) Int. Cl.
*H04N 5/232*   (2006.01)
*H04N 5/235*   (2006.01)

(52) U.S. Cl.
CPC ....... *H04N 5/23212* (2013.01); *H04N 5/2356* (2013.01); *H04N 5/23222* (2013.01)

(58) Field of Classification Search
CPC ....................... H04N 5/23212; H04N 5/23219
See application file for complete search history.

(56) References Cited

U.S. PATENT DOCUMENTS

| 7,652,714 | B2 | 1/2010 | Gotanda | |
|---|---|---|---|---|
| 2005/0058337 | A1* | 3/2005 | Fujimura | G06K 9/00201 382/159 |
| 2007/0280662 | A1* | 12/2007 | Endo | G03B 13/34 396/67 |
| 2008/0136958 | A1* | 6/2008 | Nakahara | G06K 9/00255 348/345 |
| 2008/0273097 | A1* | 11/2008 | Nagashima | G06K 9/3241 348/231.99 |
| 2009/0322935 | A1* | 12/2009 | Yamasaki | G02B 7/36 348/349 |
| 2010/0073488 | A1* | 3/2010 | Murase | G06T 11/60 348/207.1 |
| 2011/0141344 | A1* | 6/2011 | Abe | G03B 3/00 348/345 |
| 2012/0044408 | A1* | 2/2012 | Sasaki | H04N 5/23219 348/345 |
| 2012/0057067 | A1* | 3/2012 | Lee | G03B 13/30 348/345 |

(Continued)

FOREIGN PATENT DOCUMENTS

| CN | 102338972 A | 2/2012 |
|---|---|---|
| TW | 201127026 | 8/2011 |

*Primary Examiner* — Dennis Hogue
*Assistant Examiner* — John H Morehead, III
(74) *Attorney, Agent, or Firm* — Winston Hsu (57) ABSTRACT

A focusing method for an image capturing device includes determining a first focus distance according to a first focus frame of the plurality of focus frames; capturing a first image according to the first focus frame, determining a second focus distance according to a second focus frame of the plurality of focus frames, and detecting whether a second depth of field corresponding to the second focus distance is overlapping with a first depth of field corresponding to the first focus distance, for determining whether to capture a second image according to the second focus distance.

6 Claims, 10 Drawing Sheets

(56) References Cited

U.S. PATENT DOCUMENTS

2012/0113300 A1* 5/2012 Hamano ................ G02B 7/346
                                                    348/241
2012/0120283 A1* 5/2012 Capata ............... G06K 9/00255
                                                    348/241

* cited by examiner

FOCUSING METHOD

BACKGROUND OF THE INVENTION

1. Field of the Invention

The present invention relates to focusing methods, and more particularly, to a focusing method capable of capturing images of focus frames of all the characteristic points in the capturing area for making the captured images have clear images of all the characteristic points.

2. Description of the Prior Art

With advances of digital camera modules, almost all the electronic devices such as cell phones, tablets and personal digital assistants are now equipped with image capturing functions. When the electronic device with the digital camera module is required to capture a target, the electronic device starts a focusing procedure. In the conventional focusing procedure, the lens of the electronic device moves back and forth, and performs photo shooting on the target when the lens moves back and forth for acquiring a plurality of images. Then, the electronic device calculates the focus value of each of the plurality of images and determines a best focus distance according to the focus values. As a result, the electronic device can acquire the image containing a clear image of the target.

However, when the range that the electronic device is required to capture comprises multiple targets, the electronic device cannot precisely determine which one of the targets is the major target of the user, and cannot acquire the image that the user needs. Thus, how to capture images according to the multiple targets in the capturing area becomes a topic to be discussed.

SUMMARY OF THE INVENTION

In order to solve the above problem, the present invention discloses a focusing method capable of acquiring clear images of all the characteristic points.

The present invention further discloses a focusing method for an image capturing device, comprising detecting a plurality of focus frames of a plurality of characteristic points in a capturing area; determining a first focus distance according to a first focus frame of the plurality of focus frames; capturing a first image according to the first focus frame; determining a second focus distance according to a second focus frame of the plurality of focus frames; and detecting whether a second depth of field corresponding to the second focus distance is overlapping with a first depth of field corresponding to the first focus distance, for determining whether to capture a second image according to the second focus distance.

The present invention further discloses a focusing method for an image capturing device, comprising detecting a plurality of focus frames of a plurality of characteristic points in a capturing area; determining a plurality of focus distances and a plurality of depths of field of the plurality of focus distances according to the plurality of focus frames; generating a plurality of overlapped groups by classifying the plurality of focus distances according to the plurality of depths of field, each overlapped group comprising a number of the plurality of focus distances, wherein a depth of field corresponding to each focus distance in the overlapped group overlaps with depths of field of the rest focus distances in the overlapped group; and capturing a plurality of images according to focus distances included in overlapping groups.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
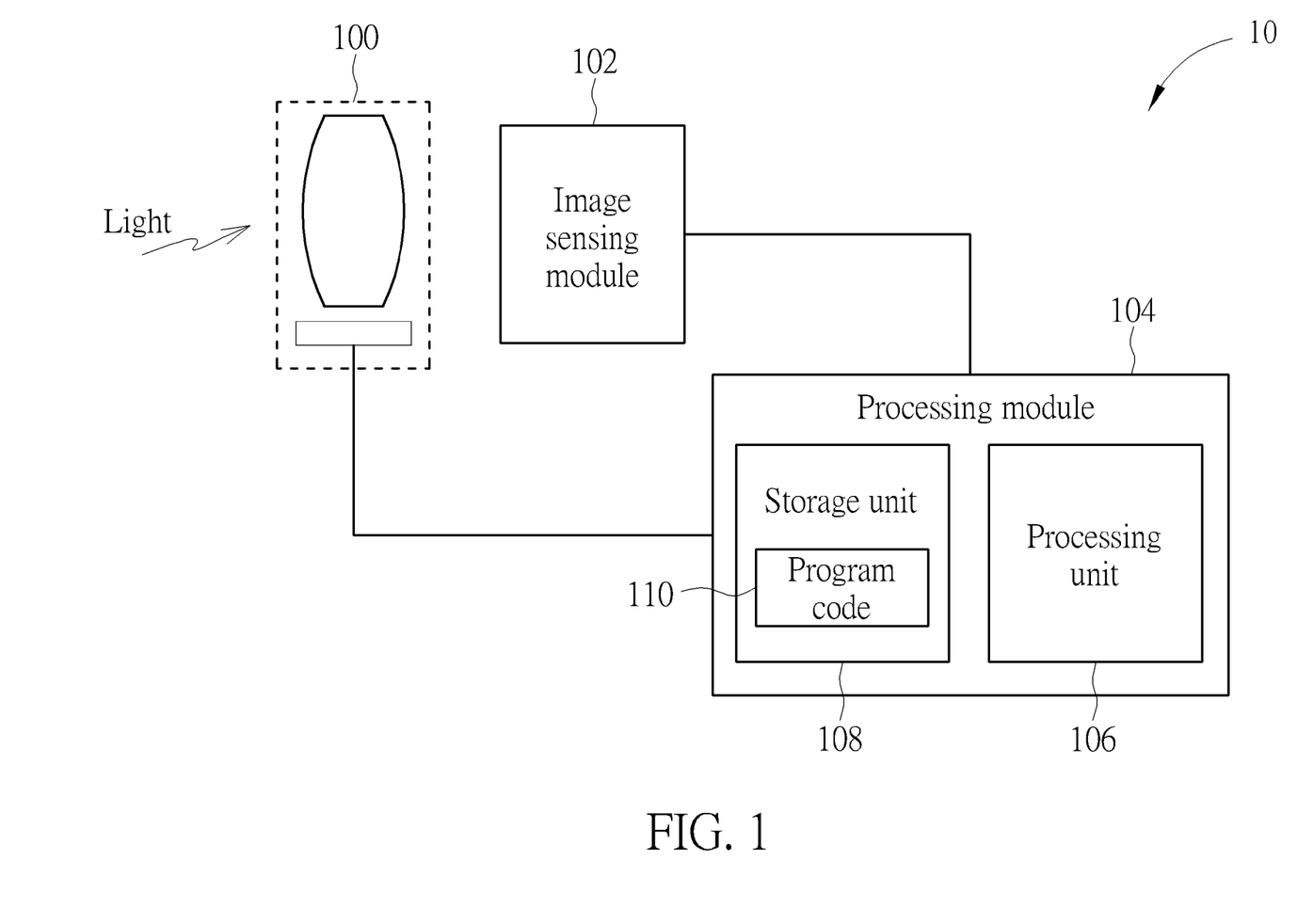
FIG. 1 is a schematic diagram of an image capturing device according to an embodiment of the present invention.

Please refer to FIG. 1, which is schematic diagram of an image capturing device 10 according to an embodiment of the present invention. The image capturing device 10 is an electronic device with an image capturing function such as a digital camera or a smart phone, and is not limited herein. The image capturing device 10 comprises a lens 100, an image sensing module 102 and a processing module 104. The processing module 104 comprises a processing unit 106, such as a microprocessor or Application Specific Integrated Circuit (ASIC), and a storage unit 108. The storage unit 108 may be any data storage device that can store a program code 110, accessed and executed by the processing unit 106 for controlling the lens 100 and the image sensing module 102 to capture images, appropriately. Examples of the storage unit 108 include but are not limited to a subscriber identity module (SIM), read-only memory (ROM), flash memory, random-access memory (RAM), CD-ROM/DVD-ROM, magnetic tape, hard disk and optical data storage device.

When a range that the image capturing device 10 is required to capture comprises multiple targets, the present invention provides focusing methods capable of capturing images of all characteristic points in the capturing area and the realization method thereof, for allowing the captured images to contain the clear images of all the characteristic points in the capturing area. As a result, the user can select needed images according to different requirements, so as to provide a wonderful user experience.

Figure 2:
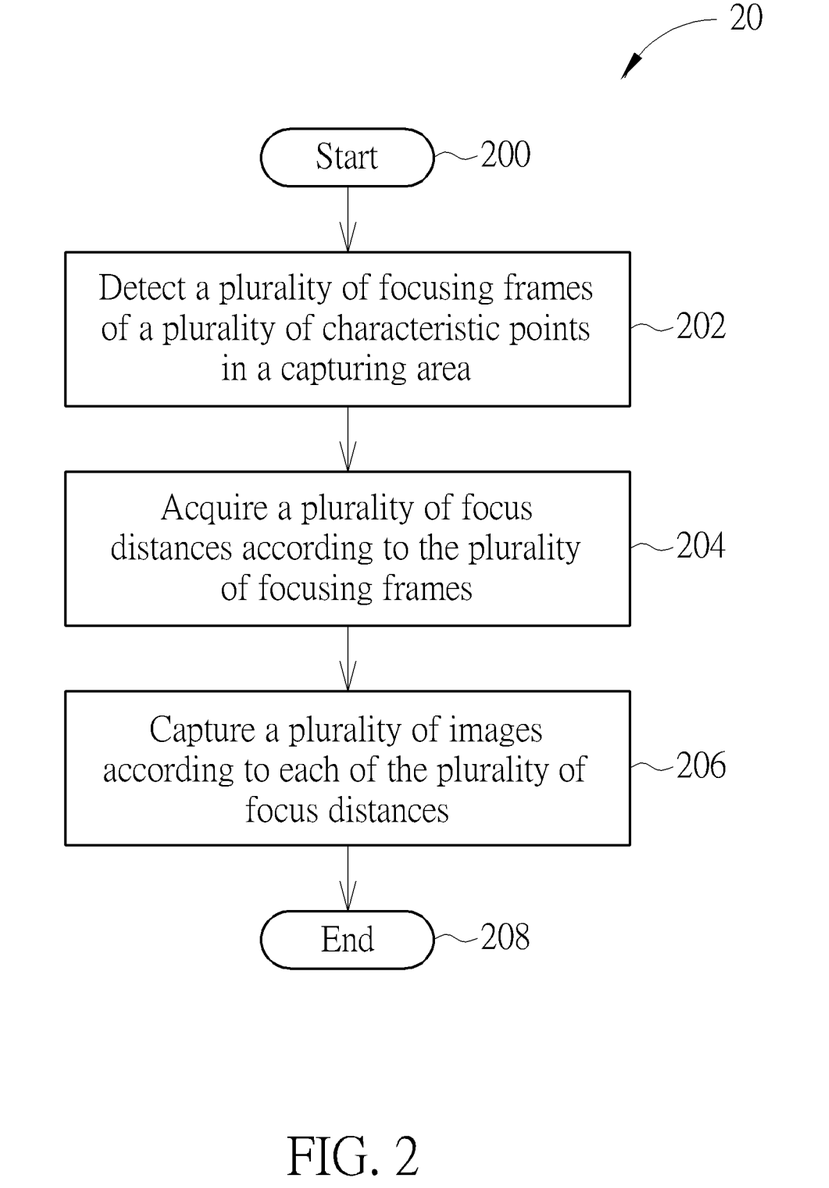
FIG. 2 is a flowchart of a focusing method according to an embodiment of the present invention.

In detail, please refer to FIG. 2, which is a flow chart of a focusing method 20 according to an embodiment of the present invention. The focusing method 20 can be utilized in the image capturing device 10 and can be compiled into the program code 110 shown in FIG. 1. The focusing method 20 comprises the following steps:

Step 200: Start.

Step 202: Detect a plurality of focusing frames of a plurality of characteristic points in a capturing area.

Step 204: Acquire a plurality of focus distances according to the plurality of focusing frames.

Step 206: Capture a plurality of images according to each of the plurality of focus distances.

Step 208: End.

According to the focusing method 20, the processing unit 106 detects a plurality of characteristic points in a capturing area of the lens 100 and the image sensing module 102 and acquires a focus frame of each characteristic point. The characteristic points may be the image characteristics such as face positions, hand positions and corners, and are not limited herein. Next, the processing unit 106 acquires the focus distance of each focus frame and accordingly adjusts the lens 100, for capturing (e.g. photo shooting) the images corresponding to each of the focus distances via the image sensing module 102. In other words, the image capturing device 10 performs photo shooting according to the focus distance of each focus frame (i.e. each characteristic point), contiguously, for capturing the clear images of each characteristic point. The user can select the images or perform image processing procedures such as image synthesis according to different requirements.

Figure 3:
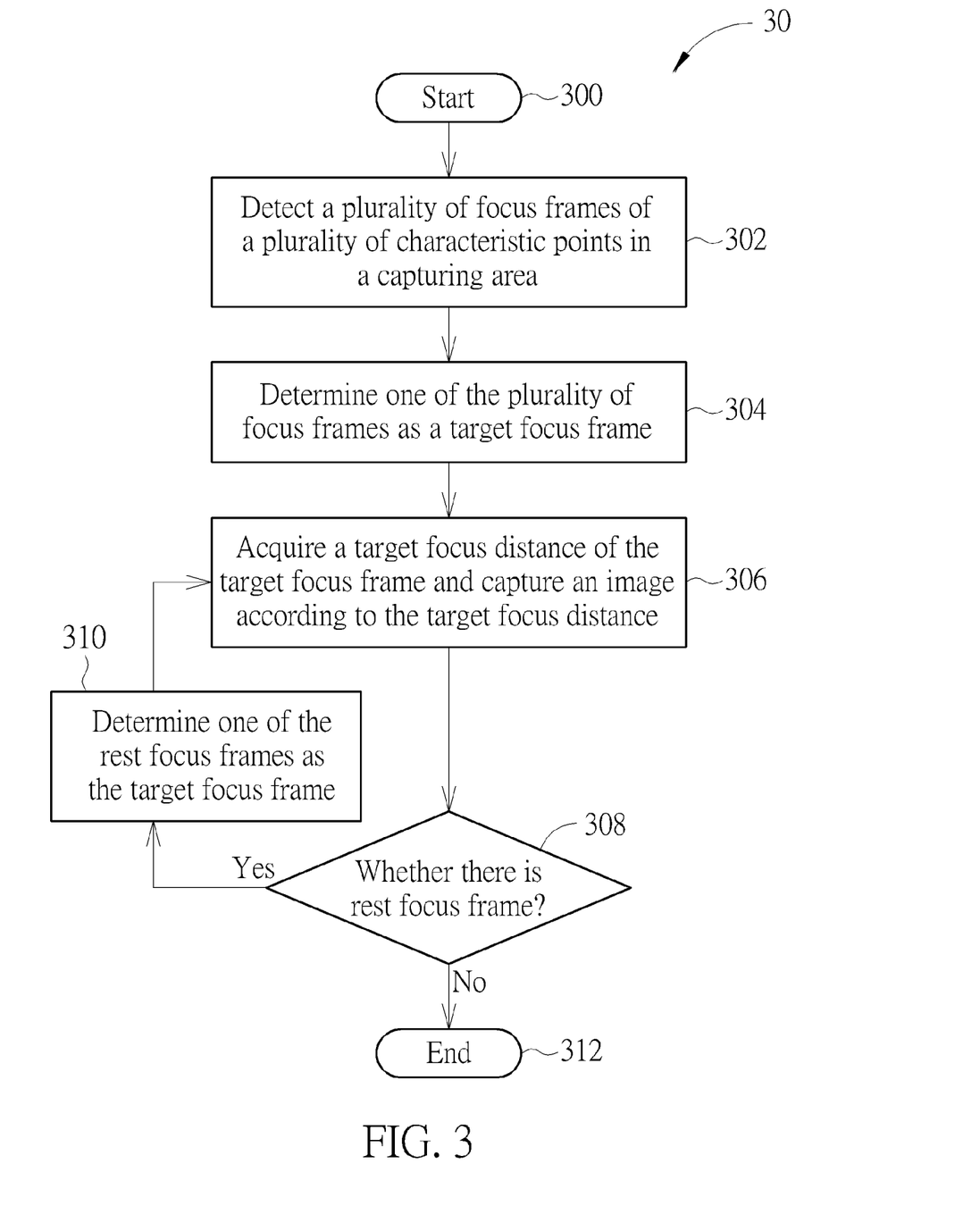
FIG. 3 is a flowchart of a realization method of the focusing method shown in FIG. 2.

Please refer to FIG. 3, which is a flowchart of a focusing method 30 according to an embodiment of the present invention. The focusing method 30 is a realization method of the focusing method 20 shown in FIG. 2, which can be compiled into the program code 110 shown in FIG. 1 and comprises the following steps:

Step 300: Start.

Step 302: Detect a plurality of focus frames of a plurality of characteristic points in a capturing area.

Step 304: Determine one of the plurality of focus frames as a target focus frame.

Step 306: Acquire a target focus distance of the target focus frame and capture an image according to the target focus distance.

Step 308: Determine whether there is rest focus frame, if yes, perform step 310; otherwise, perform step 312.

Step 310: Determine one of the rest focus frames as the target focus frame, and perform step 306.

Step 312: End.

Figure 4:
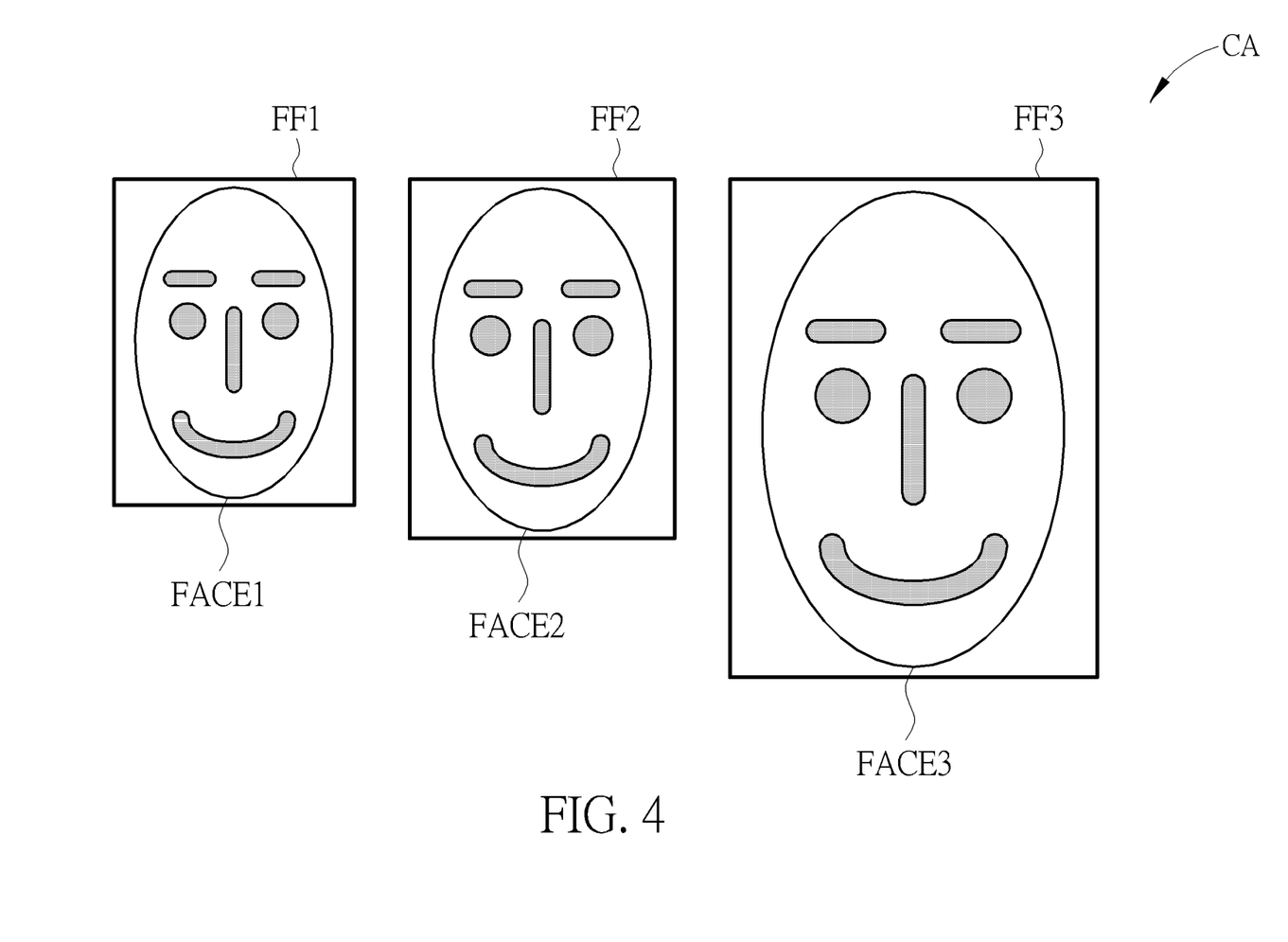
FIG. 4 is a schematic diagram of a capturing area according to an embodiment of the present invention.

As to details of the focusing method 30 please refer to FIG. 4, which is a schematic diagram of a capturing area CA according to an embodiment of the present invention. The processing unit 106 first detects faces FACE1-FACE3 as the characteristic points CP1-CP3 and generates focus frames FF1-FF3 corresponding to the characteristic points CP1-CP3, respectively (step 302). Next, the processing unit 106 determines the focus frame FF1 as a target focus frame and acquires a focus distance F1 of the focus frame FF1. The method of acquiring the focus distance of the focus frame according to the focus frame should be well known to those with ordinary skill in the art, and is not narrated herein for brevity. After acquiring the focus distance F1, the processing unit 106 adjusts the position of the lens 100 to be in a position that makes the focus distance be equivalent to the focus distance F1 and controls the image sensing module 102 to capture an image IMG1 (steps 304 and 306).

After acquiring the image IMG1, the processing unit 106 determines the rest focus frames comprises the focus frames FF2 and FF3 (step 308). Thus, the processing unit 106 determines the focus frame FF2 (i.e. one of the rest focus frames) as the target focus frame and acquires a focus distance F2 of the focus frame FF2. After acquiring the focus distance F2, the processing unit 106 adjusts the position of the lens 100 to be in a position that makes the focus distance be equivalent to the focus distance F2 and controls the image sensing module 102 to capture an image IMG2 (steps 310 and 306), and so on.

Accordingly, the image capturing device 10 acquires the images IMG1-IMG3 corresponding to the characteristic points CP1-CP3, respectively. Since the images IMG1-IMG3 are captured according to the focus distances F1-F3 of the characteristic points CP1-CP3, the images IMG1-IMG3 contain the face FACE1-FACE3 with different clarities, wherein the face FACE1 is most clear in the image IMG1, the face FACE2 is most clear in the image IMG2, and the face FACE3 is most clear in the image IMG3. As a result, the user can select the images according to different requirements. Or, the image capturing device 10 may perform the image processing procedure such as image synthesis to combine the images IMG1-IMG3, for acquiring an image containing clear images of faces FACE1-FACE3.

Figure 5:
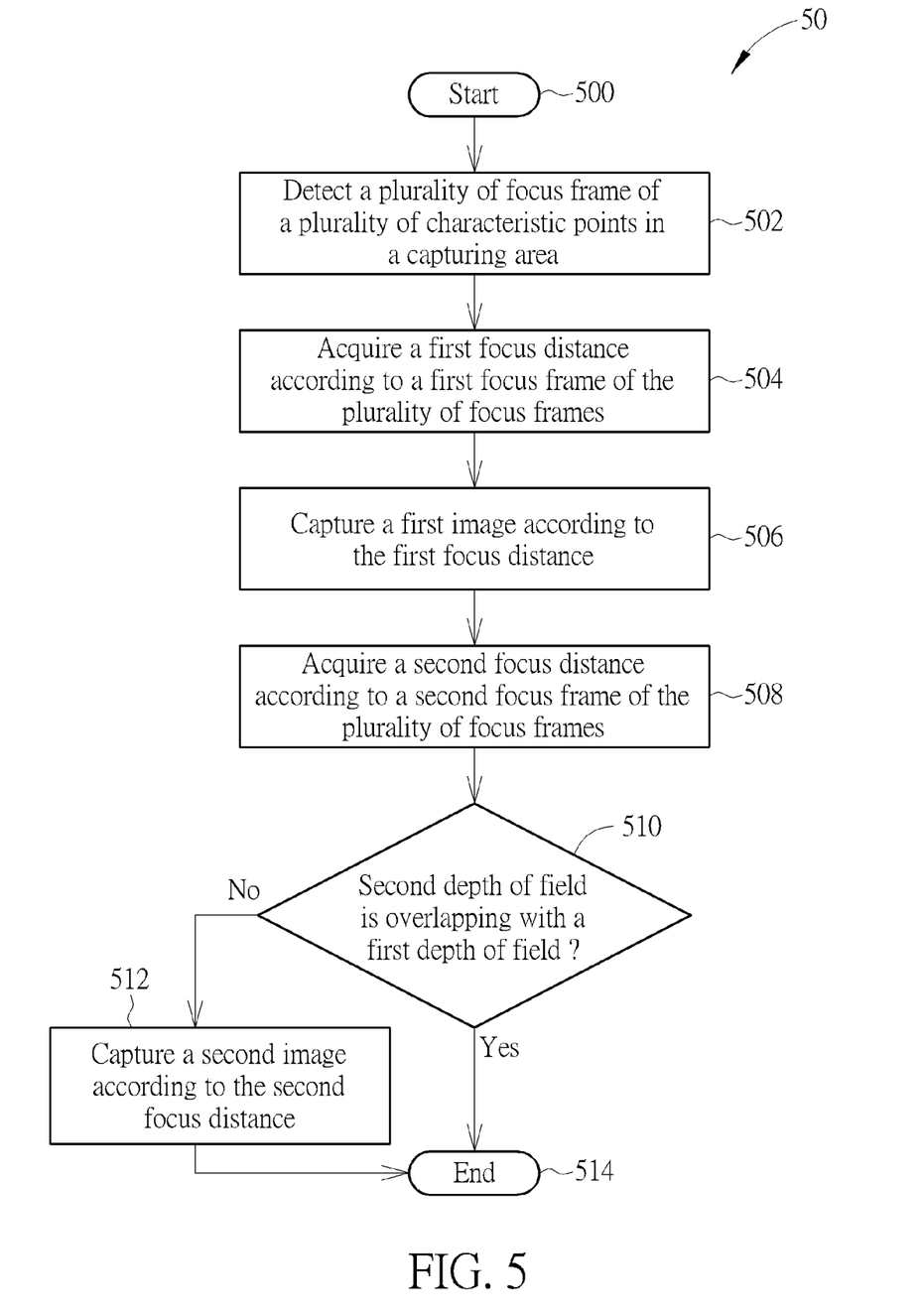
FIG. 5 is a flowchart of another focusing method according to an embodiment of the present invention.

Please refer to FIG. 5, which is a flow chart of a focusing method 50 according to an embodiment of the present invention. The focusing method 50 can be utilized in the image capturing device 10, and can be compiled into the program code 110 which comprises the following steps:

Step 500: Start.

Step 502: Detect a plurality of focus frame of a plurality of characteristic points in a capturing area.

Step 504: Acquire a first focus distance according to a first focus frame of the plurality of focus frames.

Step 506: Capture a first image according to the first focus distance.

Step 508: Acquire a second focus distance according to a second focus frame of the plurality of focus frames.

Step 510: Determine whether a second depth of field corresponding to the second focus distance is overlapping with a first depth of field corresponding to the first focus distance, if the second depth of field corresponding to the second focus distance is overlapping with the first depth of field corresponding to the first focus distance, perform step 514; if the second depth of field corresponding to the second focus distance is not overlapping with the first depth of field corresponding to the first focus distance, perform step 512.

Step 512: Capture a second image according to the second focus distance.

Step 514: End.

Figure 6:
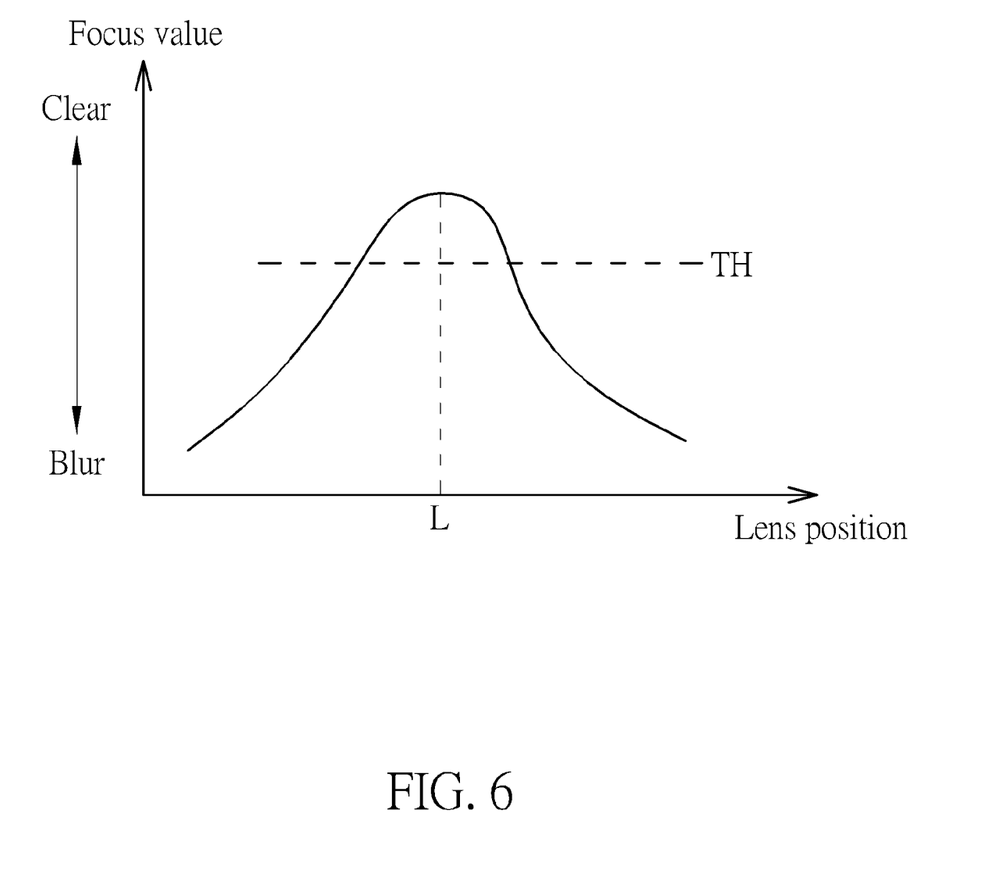
FIG. 6 is a schematic diagram of relationship between lens position and the focus value according to an embodiment of the present invention.

According to the focusing method 50, the processing unit 106 detects a plurality of characteristic points in a capturing area of the lens 100 and the image sensing module 102 and acquires a focus frame of each characteristic point when the image capturing device 10 is required to capture images. The characteristic points may be the image characteristics such as face positions, hand positions and corners, and are not limited herein. Next, the processing unit 106 acquires a first focus distance according to a first focus frame of the plurality of focus frames and captures a first image according to the first focus distance. The first focus distance is corresponding to a first depth of field and if a depth of filed corresponding to a focus distance of a focus frame of a characteristic point is overlapping with the first depth of field corresponding to the first focus distance, the image corresponding to the characteristic point is clear in the first image. Please refer to FIG. 6, which is a schematic diagram of relationships between the lens position and the focus value according to an embodiment of the present invention. As shown in FIG. 6, the image corresponding to the lens position L has the greatest clarity when the position of the lens 100 is adjusted to the lens position L and the image capturing device 10 performs photo shooting. In addition, the image with a focus value exceeding the clarity threshold TH is considered as a clear image.

Therefore, when the processing unit 106 acquires a second focus distance according to a second focus frame of the plurality of focus frames, the processing unit 106 determines whether a second depth of field corresponding to the second focus distance is overlapping with the first depth of field corresponding to the first focus distance, for determining whether to capture a second image according to the second focus distance. If the second depth of field corresponding to the second focus distance is overlapping with the first depth of field corresponding to the first focus distance, the processing unit 106 determines that the image capturing according to the second focus distance is not needed since the images corresponding to the second focus frame are sufficiently clear in the first image. On the other hand, if the second depth of field corresponding to the second focus distance is not overlapping with the first depth of field corresponding to the first focus distance, the processing unit 106 adjusts the position of the lens 100 to be a position which makes the focus distance be equivalent to the second focus distance and controls the image sensing module 102 to capture the second images since the image of the second focus frame is blur in the first image. As a result, the image capturing device 10 can acquire the images with the clear images of all the characteristic points in the capturing area. In comparison to the focusing method 20, the number of the focusing method 50 captures images can be reduced, so as to save the storage for storing images and decrease the time of capturing the images.

Figure 7:
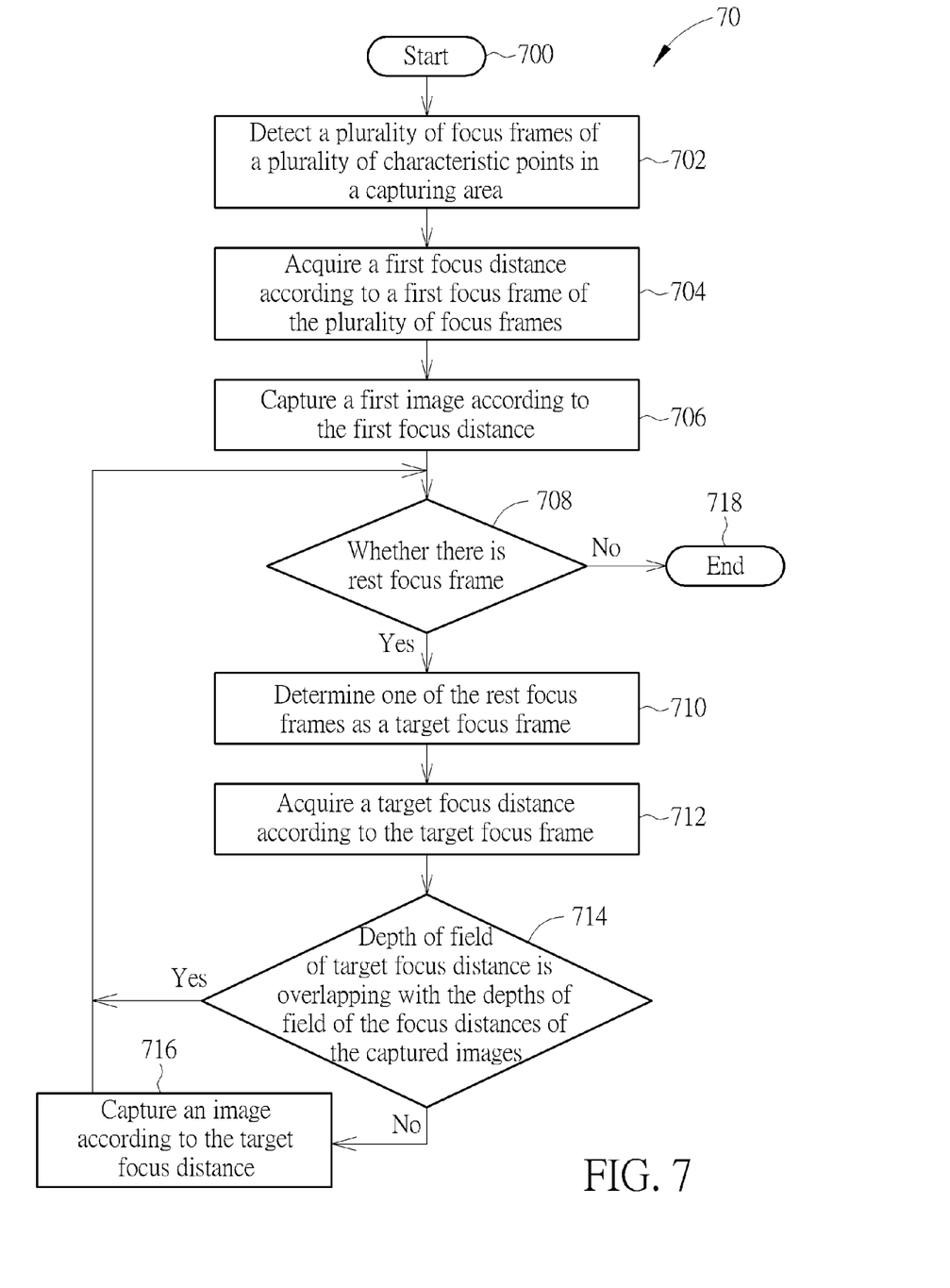
FIG. 7 is a flowchart of a realization method of the focusing method shown in FIG. 5.

Please refer to FIG. 7, which is a flowchart of a focusing method 70 according to an embodiment of the present invention. The focusing method 70 is a realization method of the focusing method 50 shown in FIG. 5. The focusing method 70 can be compiled into the program code 110 shown in FIG. 1, and comprises the following steps:

Step 700: Start.

Step 702: Detect a plurality of focus frames of a plurality of characteristic points in a capturing area.

Step 704: Acquire a first focus distance according to a first focus frame of the plurality of focus frames.

Step 706: Capture a first image according to the first focus distance.

Step 708: Determine whether there is rest focus frame, if yes, perform step 710; otherwise, perform step 718.

Step 710: Determine one of the rest focus frames as a target focus frame.

Step 712: Acquire a target focus distance according to the target focus frame.

Step 714: Determine whether a depth of field corresponding to the target focus distance is overlapping with the depths of field of the focus distances of the captured images; if yes, perform step 708; otherwise, perform step 716.

Step 716: Capture an image according to the target focus distance.

Step 718: End.

Figure 8:
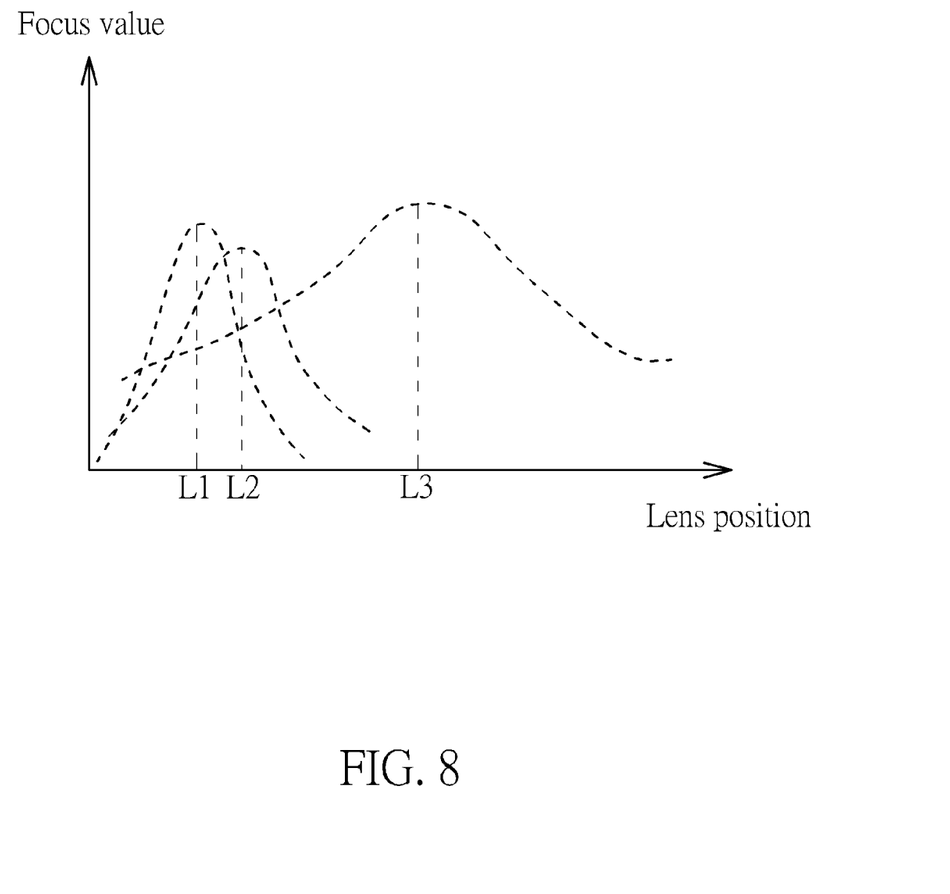
FIG. 8 is a schematic diagram of relationship between lens position and the focus value according to an embodiment of the present invention.

As to the detailed operations of the focusing method 70 please jointly refer to FIG. 4 and FIG. 8, which is a schematic diagram of the relationships between the lens position and the focus value in FIG. 4. As shown in FIG. 4, the capturing area CA comprises the faces FACE1-FACE3. The processing unit 106 first detects faces FACE1-FACE3 as the characteristic points CP1-CP3 and generates focus frames FF1-FF3 corresponding to the characteristic points CP1-CP3, respectively (step 702). Next, the processing unit 106 acquires the focus distance F1 of the focus frame FF1. The method of acquiring the focus distance of the focus frame according to the focus frame should be well known to those with ordinary skill in the art, and is not narrated herein for brevity. After acquiring the focus distance F1, the processing unit 106 adjusts the position of the lens 100 to be a position which makes the focus distance be equivalent to the focus distance F1 and controls the image sensing module 102 to capture an image IMG4 (steps 704 and 706)

After acquiring the image IMG4, the processing unit 106 determines the rest focus frames comprises the focus frames FF2 and FF3. The processing unit 106 determines the focus frame FF2 as the target focus frame and acquires the focus distance F2 of the focus frame FF2 (steps 710 and 712). Since a depth of field corresponding to the focus distance F2 is overlapping with a depth of field DF1 corresponding to the focus distance F1, the processing unit 106 determines not to capture the image according to the focus distance F2 (step 714). Further, the processing unit 106 determines the focus frame FF3 as the target focus frame and acquires the focus distance F3 of the focus frame FF3 (steps 708-712). Since a depth of field corresponding to the focus distance F3 is not overlapping with the depth of field DF1, the processing unit 106 adjusts the position of the lens 100 to be a position which makes the focus distance be equivalent to the focus distance F3 and controls the image sensing module 102 to capture an image IMG5 (steps 714 and 716). Finally, the processing unit 106 determines there is no rest focus frame, and the image capturing procedure finishes.

According to the above, the image capturing device 10 can acquire the image IMG4 corresponding to the characteristic points CP1 and CP2 (i.e. the faces FACE1 and FACE2) and the image IMG5 corresponding to the characteristic point CP3 (i.e. the face FACE3). Since the depth of field corresponding to the focus distance F2 is overlapping with the depth of field DF1 of the focus distance F1, the image IMG4 comprises clear images of the faces FACE1 and FACE2. As a result, the user can select the images according to different requirements. In comparison with the focusing method 30, the number of capturing images in the focusing method 70 is reduced. The storage for storing the images is saved and the time of capturing images is therefore decreased.

Figure 9:
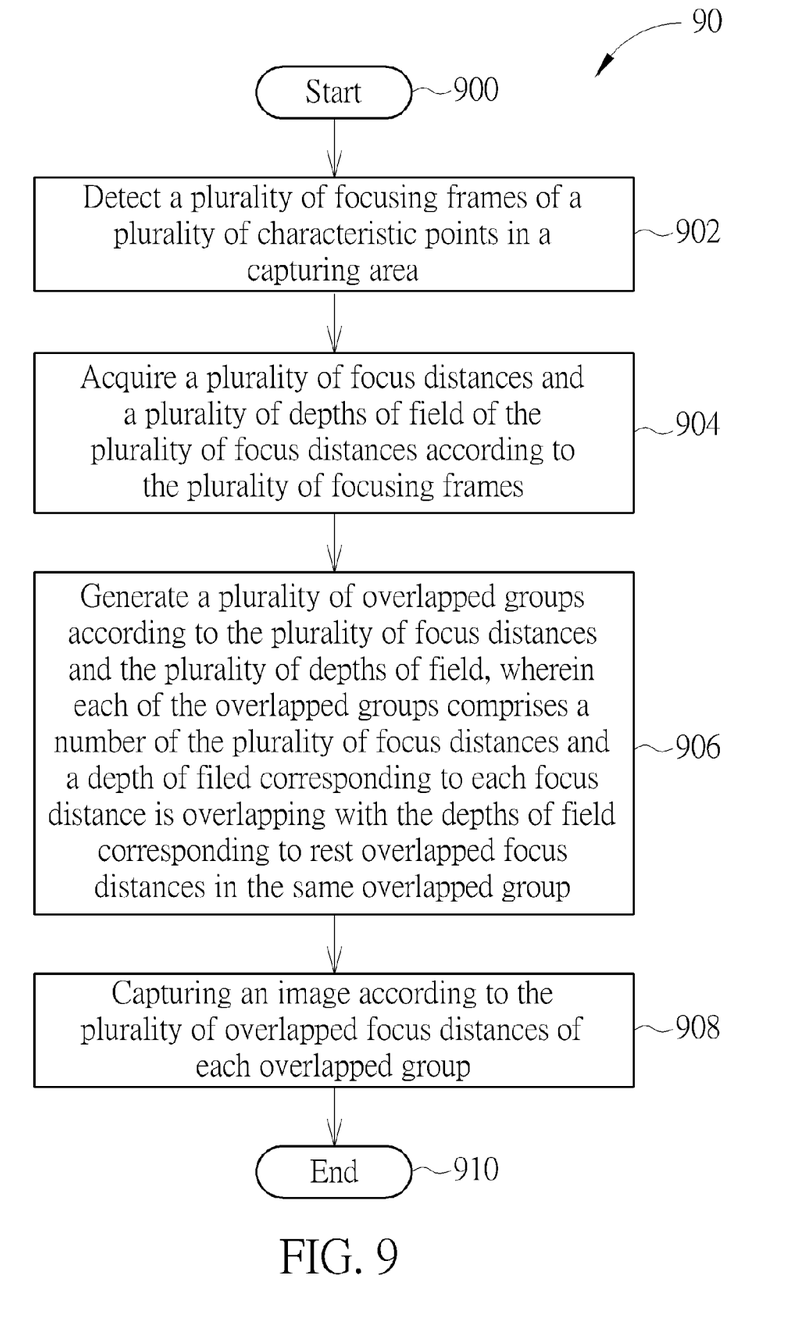
FIG. 9 is a flowchart of still another focusing method according to an embodiment of the present invention.

Please refer to FIG. 9, which is a flowchart of a focusing method 90 according to an embodiment of the present invention. The focusing method 90 can be utilized in the image capturing device 10 and can be compiled into the program code 110 shown in FIG. 1. The focusing method 90 comprises the following steps:

Step 900: Start.

Step 902: Detect a plurality of focusing frames of a plurality of characteristic points in a capturing area.

Step 904: Acquire a plurality of focus distances and a plurality of depths of field of the plurality of focus distances according to the plurality of focusing frames.

Step 906: Generate a plurality of overlapped groups according to the plurality of focus distances and the plurality of depths of field, wherein each of the overlapped groups comprises a number of the plurality of focus distances and a depth of filed corresponding to each focus distance is overlapping with the depths of field corresponding to rest overlapped focus distances in the same overlapped group.

Step 908: Capturing an image according to the plurality of overlapped focus distances of each overlapped group.

Step 910: End.

According to the focusing method 90, the processing unit 106 detects a plurality of characteristic points in a capturing area of the lens 100 and the image sensing module 102 and acquires a focus frame of each characteristic point when the image capturing device 10 is required to capture images. The characteristic points may be the image characteristics such as face positions, hand positions and corners, and are not limited herein. Next, the processing unit 106 generates a plurality of overlapped groups according to a plurality of focus distances and a plurality of depths of field thereof, wherein each of the overlapped groups comprises a number of (i.e., some of) the plurality of focus distances, and a depth of filed corresponding to each focus distance is overlapping with the depths of field corresponding to the rest focus distances of the same overlapped group. In other words, the image capturing device 10 only needs to capture a single image according to any one of the plurality focus distances of an overlapped group, and the image comprises the clear images corresponding to all the focus distances in the overlapped group (step 906). Thus, the image capturing device 10 can capture the plurality of images comprising the clear images of all the characteristic points. According to different applications and design concepts, the method of the image capturing device 10 capturing the image according to the plurality of focus distances of each overlapped group can be appropriately changed. For example, the image capturing device 10 may capture the image according to an average of the overlapped focus distances in each overlapped group.

Figure 10:
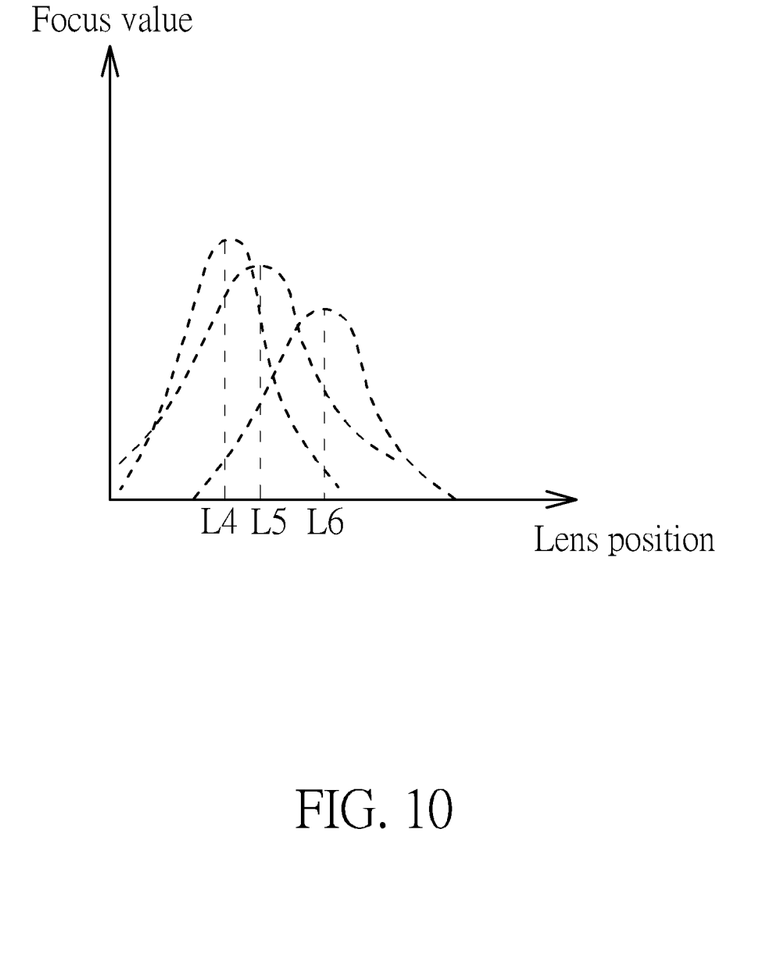
FIG. 10 is a schematic diagram of relationship between lens position and the focus value according to an embodiment of the present invention.

As to the detailed operations of the focusing method 90 please refer to FIG. 10, which is a schematic diagram of relationships between the lens position and the focus value according to an embodiment of the present invention. FIG. 10 shows lens position L4-L6, which are respectively corresponding to focus distances F4-F6 corresponding to the focus frame FF4-FF6 of the characteristic points CP4-CP6 and the focus distances F4-F6 are respectively corresponding depths of field DF4-DF6. The depth of field corresponding to the focus distance F4 is overlapping with the depths of field DF5 and DF6, the depth of field corresponding to the focus distance F5 is overlapping with the depths of field DF4 and DF6, and the depth of field corresponding to the focus distance F6 is overlapping with the depths of field DF4 and DF5. In such a condition, the processing unit 106 determines the focus distances F4-F6 as focus distances OF1-OF3 of an overlapped group OS. Next, the processing unit 106 calculates a focus distance average of the focus distances OF1-OF3 (i.e. the focus distances F4-F6), and adjusts the position of the lens 100 according to the focus distance average AVG for capturing an image IMG6. As a result, the images corresponding to the characteristic points CP4-CP6 have similar clarity in the image IMG6, and the phenomenon of uneven clarity can be avoided.

Please note that, the above embodiments acquires images containing the clear images of all the characteristic points in the capturing area via performing the image capturing according to the focus frames of all the characteristic points in the capturing area. The user can select the images according to different requirements. According to different applications and design concepts, those with ordinary skill in the art may observe appropriate alternations and modifications. For example, the process unit 106 may perform the image capturing according to the order sequence of the focus distances, for reducing the time of adjusting the position of the lens 100. The time of performing image capturing can therefore be decreased.

As to the detailed operations of the focusing method 90 please refer to FIG. 10, which is a schematic diagram of relationships between the lens focus and the focus value according to an embodiment of the present invention. FIG. 10 shows focuses F4-F6 corresponding to the focus frame FF4-FF6 of the characteristic points CP4-CP6 and the corresponded depth range DF4-DF6. As shown in FIG. 10, the focus F4 is within the depth ranges DF5 and DF6, the focus F5 is within the depth ranges DF4 and DF6, and the focus F6 is within the depth range DF4 and DF5. In such a condition, the processing unit 106 determines the focuses F4-F6 as overlapped focuses OF1-OF3 of an overlapped group OS. Next, the processing unit 106 calculates a focus average of the overlapped focuses OF1-OF3 (i.e. the focuses F4-F6), and adjusts the focus of the lens 100 according to the focus average AVG for capturing an image IMG6. As a result, the images corresponding to the characteristic points CP4-CP6 have similar clarity in the image IMG6, and the phenomenon of uneven clarity can be avoided.

Please note that, the above embodiments acquires images containing the clear images of all the characteristic points in the capturing area via performing the image capturing according to the focus frames of all the characteristic points in the capturing area. The user can select the images according to different requirements. According to different applications and design concepts, those with ordinary skill in the art may observe appropriate alternations and modifications. For example, the process unit 106 may perform the image capturing according to the order sequence of the focuses, for reducing the time of adjusting the focus of the lens 100. The time of performing image capturing can therefore be decreased.

Those skilled in the art should readily make combinations, modifications and/or alterations on the abovementioned description and examples. The abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SiP), a computer on module (COM), and the image capturing device 10.

To sum up, the focusing method of the above embodiments acquires images containing the clear images of all the characteristic points in the capturing area via performing the image capturing according to the focus frames of all the characteristic points in the capturing area. As a result, the user can select images according to different requirements, resulting wonderful user experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A focusing method for an image capturing device, comprising:
   detecting a plurality of focus frames of a plurality of characteristic points in a capturing area;
   determining a first focus distance according to a first focus frame of the plurality of focus frames;
   capturing a first image according to the first focus distance;
   determining a second focus distance according to a second focus frame of the plurality of focus frames;

detecting whether a second depth of field corresponding to the second focus distance is overlapping with a first depth of field corresponding to the first focus distance, for determining whether to capture a second image according to the second focus distance; and capturing the second image according to the second focus distance after determining that the second depth of field corresponding to the second focus distance is not overlapping with the first depth of field corresponding to the first focus distance.

2. The focusing method of claim 1, wherein the plurality of characteristic points is a plurality of face positions in the capturing area.

3. The focusing method of claim 1, wherein the step of detecting whether the second depth of field corresponding to the second focus distance is overlapping with the first depth of field corresponding to the first focus distance, for determining whether to capture the second image according to the second focus distance comprises:

determining not to capture the second image when the second depth of field corresponding to the second focus distance is overlapping with the first depth of field corresponding to the first focus distance.

4. A focusing method for an image capturing device, comprising:

detecting a plurality of focus frames of a plurality of characteristic points in a capturing area;

determining a plurality of focus distances and a plurality of depths of field of the plurality of focus distances according to the plurality of focus frames;

generating at least one overlapped group by classifying the plurality of focus distances according to the plurality of depths of field, each overlapped group comprising a number of the plurality of focus distances, wherein a depth of field corresponding to each focus distance in the overlapped group overlaps with depths of field of other focus distances in the overlapped group; and capturing a plurality of images according to focus distances included in each overlapped group after generating the at least one overlapped group.

5. The focusing method of claim 4, wherein the plurality of characteristic points is a plurality of face positions in the capturing area.

6. The focusing method of claim 4, wherein the step of capturing the plurality of images-according to the focus distances included in each overlapped group after generating the at least one overlapped group comprises:

calculating a focus distance average according to the focus distances included in each overlapping group; and capturing the plurality of images according to the focus distance average of each overlapping group.

* * * * *